United States Patent

[11] 3,607,223

[72] Inventor John Massey Trihey
 13 Walsh St., Balwyn, Victoria, Australia
[21] Appl. No. 834,136
[22] Filed June 17, 1969
[45] Patented Sept. 21, 1971
[32] Priority June 19, 1968
[33] Australia
[31] 39,404/68

[54] PRODUCTION OF LOW-DENSITY MATERIALS
 4 Claims, No Drawings
[52] U.S. Cl. ........................................................ 75/20 F,
 29/180, 106/40, 264/42, 264/51
[51] Int. Cl. ...................................................... C21b 5/02
[50] Field of Search ........................................... 75/20

[56] References Cited
UNITED STATES PATENTS

| | | | |
|---|---|---|---|
| 2,751,289 | 6/1956 | Elliott | 75/20 |
| 2,983,597 | 5/1961 | Elliott | 75/20 |
| 3,214,265 | 10/1965 | Fiedler | 75/20 |
| 3,300,296 | 1/1967 | Hardy | 75/20 |
| 3,360,361 | 12/1967 | Albright | 75/20 |
| 3,379,517 | 4/1968 | Graper | 75/20 |

*Primary Examiner* — L. Dewayne Rutledge
*Assistant Examiner* — Joseph E. Legru
*Attorney* — Sughrue, Rothwell, Mion, Zinn & MacPeak

ABSTRACT: Low-density materials are formed by forming a molten mixture of two or more materials, one of which has a lower boiling point than the other and causing the volatilization of the lower boiling point material so as to form a foam of the higher boiling point material.

3,607,223

PRODUCTION OF LOW-DENSITY MATERIALS

BACKGROUND OF INVENTION

1. Field of Invention

The invention relates to the production of low-density materials by forming a foam of the materials. The invention is applicable to materials which hitherto have not been capable of being foamed and provides new light weight foamed products of such materials and a method for making them.

2. Prior Art

It is known to produce a number of low-density materials by the technique of converting the material to a foam comprising a large number of cells with or without gas entrapped in the cells. Common examples of such foamed materials are the foams of polystyrene and polyurethane and of natural and synthetic rubber. These foams are usually produced by the action of chemical foaming agents on chemically setting materials. Attempts have also been made to produce foams from molten metal and also from silica by the technique of passing super heated steam or other has through the material in the molten state. These attempts have generally ended in failure either because the steam or gas has merely bubbled through the molten material because it is too hot to allow the walls of the cells produced during foaming to solidify or alternatively chilling of the melt has resulted in large voids being formed instead of a uniform foam.

SUMMARY

The object of this invention is to produce low-density foamed forms of material such as silica, metals and other materials from which foamed products have hitherto not been produced. A further object of the invention is to provide a method for producing low-density materials in the foamed form.

This invention provides according to one of its aspects a method for forming low density materials by foaming them which comprises the steps of forming an intimate molten mixture of at least two materials, at least one of which is a settable material and has a higher boiling point than the other, volatilizing the lower boiling point material and setting the said one material to form a foam of that material. The lower boiling point material may be volatilized by reducing the pressure of the environment of the mixture to a point where volatilization of it takes place. At least part of the latent heat of volatilization of the lower boiling point material is preferably provided from the said one material and preferably the heat thereby given up by the said one material is latent heat of fusion of that material whereby the process of volatilization of the low boiling point material occurs simultaneously with the solidification of the higher boiling point material whereby a foam of the higher boiling point material is formed with minute foam cells.

The invention also provides a foamed product of metal, silica or other settable materials.

As used in this specification the term "mixture" is not limited to its strict chemical meaning but is intended to include mixtures, partial solutions, suspensions, colloidal suspensions, emulsions, alloys and solutions.

One method of carrying out the process of the invention is to form a molten mixture of two materials at atmospheric pressure and then partly evacuate the environment to reduce the pressure. Another method is to form the molten mixture in a pressurized environment so that at least one of the materials is in the form of a super heated liquid and then releasing the pressure to allow volatilization of that material.

The exact nature of the mechanisms involved in the process of this invention is not fully understood. However it is believed that the process depends basically on the fact that when volatilization of one material takes place the latent heat of vaporization is supplied from the other material thereby chilling that material and solidifying it in the vicinity of the vaporization, thereby forming a cell. Thus a foam is formed in which the cells formed may be quite minute—possibly even of molecular dimensions.

Assuming a sufficient quantity of the volatilizable material, the initial temperature, and therefore the extent to which the latent heat required for the volatilization is taken from the higher boiling point material in the form of sensible heat, can be varied to control the size of the foam cavities formed before solidification of their cell walls.

DESCRIPTION OF PREFERRED EMBODIMENT

The invention will be better understood from the following example.

EXAMPLE 1

In one experiment which I have carried out, a molten mixture of selenium and stannous chloride and aluminum was formed in a retort under pressure of approximately 8 p.s.i.g. under an argon atmosphere. The pressure in the retort was reduced and a solid product was produced which had the appearance of aluminum. However, on measuring the specific gravity of the product this was found to be 1.7 compared to the specific gravity of aluminum metal of 2.82. Sectioning of the product showed it to be uniform in texture and free of apparent voids.

The above experiment shows that it is possible by the method of this invention to produce a form of aluminum metal of very substantially lower density than any which is hitherto known and also indicates that the method of the invention is applicable to materials other than aluminum. In particular the method may be used to form a lightweight silicaceous product. It will be apparent that such new products may have considerable utility by combining in a cheap and readily available raw material properties of high strength with light weight and good thermal insulation. The materials may be cast, moulded or extruded in a manner similar to that known in connection with the production of foamed plastic materials.

I claim:

1. A method of forming a low density product of a settable material by foaming said material, said method comprising:
    forming an intimate molten mixture consisting essentially of said settable material and a volatilizable material having a volatilization temperature higher than the fusion temperature of said settable material but lower than the volatilization temperature of said settable material;
    heating said mixture to the volatilization temperature of said volatilizable material; and
    maintaining the heat balance of said mixture such that the heat required for the volatilization of said volatilizable material is supplied at least in part by the latent heat of fusion of said settable material, whereby, as the volatilization of said volatilizable material proceeds, local solidification of the settable material takes place, thereby forming a stable foam of said settable material.

2. A method as claimed in claim 1, wherein said molten mixture is formed at atmospheric pressure and the pressure is reduced to an extent sufficient to cause volatilization of said volatilizable material.

3. The method claimed in claim 1, wherein the mixture is formed in a pressurized environment so that the volatilizable material is in the form of a superheated liquid and the pressure is then released to volatilize said volatilizable material.

4. The method claimed in claim 1, wherein the temperature of the mixture is raised to a point between the volatilization temperature of the volatilizable material and the settable material.